(12) United States Patent
Liu et al.

(10) Patent No.: US 9,774,284 B2
(45) Date of Patent: Sep. 26, 2017

(54) ROTOR POSITION ESTIMATION APPARATUS AND METHODS

(71) Applicant: Rockwell Automation Technologies, Inc., Mayfield Heights, OH (US)

(72) Inventors: Jingbo Liu, Grafton, WI (US); Thomas Nondahl, Greenfield, WI (US); Peter B. Schmidt, Franklin, WI (US); Takayoshi Matsuo, Brown Deer, WI (US); Timothy M. Rowan, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/625,860

(22) Filed: Feb. 19, 2015

(65) Prior Publication Data

US 2016/0248354 A1 Aug. 25, 2016

(51) Int. Cl.
*G05B 11/28* (2006.01)
*H02P 6/18* (2016.01)
*H02P 27/08* (2006.01)
*H02P 21/18* (2016.01)

(52) U.S. Cl.
CPC ............ *H02P 6/18* (2013.01); *H02P 21/18* (2016.02); *H02P 27/08* (2013.01)

(58) Field of Classification Search
CPC ........ H02P 6/18; H02P 25/089; H02P 29/077; H02P 2203/09
USPC ....................................................... 318/599
See application file for complete search history.

(56) References Cited

U.S. PATENT DOCUMENTS

| 3,723,840 | A | | 3/1973 | Opal et al. |
| 4,823,251 | A | | 4/1989 | Kawabata et al. |
| 5,032,771 | A | | 7/1991 | Kerkman |
| 5,526,252 | A | | 6/1996 | Erdman |
| 5,703,449 | A | * | 12/1997 | Nagate ................. H02K 1/2746 318/400.01 |
| 5,717,305 | A | | 2/1998 | Seibel |
| 5,744,921 | A | | 4/1998 | Makaran |
| 5,909,098 | A | | 6/1999 | Konecny et al. |

(Continued)

FOREIGN PATENT DOCUMENTS

| CN | 2513286 Y | 9/2002 |
| CN | 101383585 A | 3/2009 |

(Continued)

OTHER PUBLICATIONS

Miranda et al., "Parameter and Speed Estimation for Implementing Low Speed Sensorless PMSM Drive System Based on an Algebraic Method"; Applied Power Electronics Conf.; APEC 2007, 22$^{nd}$ Annual IEEE; Feb. 1, 2007,;pp. 1406-1410.

(Continued)

*Primary Examiner* — Bickey Dhakal
(74) *Attorney, Agent, or Firm* — Fay Sharpe LLP

(57) ABSTRACT

Motor drives, methods and estimation systems are presented for estimating a rotor position of a motor load in which four sets of inverter output current samples obtained at four different sample times in a given inverter PWM cycle are converted into a corresponding stationary reference frame current value pairs, and the rotor position estimate is computed according to the stationary reference frame current values.

12 Claims, 3 Drawing Sheets

(56) References Cited

U.S. PATENT DOCUMENTS

| | | |
|---|---|---|
| 5,959,431 A | 9/1999 | Xiang |
| 5,990,654 A | 11/1999 | Skibinski et al. |
| 5,994,869 A | 11/1999 | Bacerra |
| 6,121,736 A | 9/2000 | Narazaki et al. |
| 6,124,697 A | 9/2000 | Wilkerson |
| 6,208,537 B1 | 3/2001 | Skibinski et al. |
| 6,222,335 B1 | 4/2001 | Hiti et al. |
| 6,329,781 B1 | 12/2001 | Matsui et al. |
| 6,600,980 B1 | 7/2003 | Kraska et al. |
| 6,940,249 B2 | 9/2005 | Toyoda |
| 6,965,212 B1 | 11/2005 | Wang et al. |
| 7,045,988 B2 | 5/2006 | Ha et al. |
| 7,049,778 B2 * | 5/2006 | Katanaya ............... H02P 27/08 318/400.04 |
| 7,084,604 B2 | 8/2006 | Salomaki |
| 7,102,323 B2 | 9/2006 | Zhou et al. |
| 7,468,595 B2 | 12/2008 | Lee |
| 7,679,308 B2 | 3/2010 | Tomigashi |
| 7,683,568 B2 | 3/2010 | Pande et al. |
| 7,724,549 B2 | 5/2010 | Skibinski et al. |
| 7,729,146 B2 | 6/2010 | Hayami et al. |
| 7,932,693 B2 | 4/2011 | Lee |
| 7,979,223 B2 | 7/2011 | Monti et al. |
| 7,990,097 B2 | 8/2011 | Cheng et al. |
| 8,009,450 B2 | 8/2011 | Royak et al. |
| 8,143,838 B2 * | 3/2012 | Akiyama ............ H02P 21/0003 318/400.09 |
| 8,217,602 B2 | 7/2012 | Ikei |
| 8,232,760 B2 | 7/2012 | Lu et al. |
| 8,288,886 B2 | 10/2012 | Anwar et al. |
| 8,299,646 B2 | 10/2012 | Rockenfeller et al. |
| 8,736,220 B2 | 5/2014 | Ogawa et al. |
| 8,970,154 B2 | 3/2015 | Ishikawa et al. |
| 8,981,702 B2 | 3/2015 | Katariya et al. |
| 2004/0052097 A1 | 3/2004 | Morimoto |
| 2006/0113952 A1 | 6/2006 | Zhou |
| 2007/0001635 A1 | 1/2007 | Ho |
| 2007/0007929 A1 | 1/2007 | Lee et al. |
| 2008/0001571 A1 | 1/2008 | Tomigashi |
| 2008/0074074 A1 | 3/2008 | Skibinski et al. |
| 2008/0312855 A1 | 12/2008 | Monti et al. |
| 2009/0146592 A1 | 6/2009 | Tobari et al. |
| 2009/0153083 A1 | 6/2009 | Rozman |
| 2009/0200980 A1 | 8/2009 | Ramu et al. |
| 2010/0194319 A1 * | 8/2010 | Ito .......................... H02P 6/183 318/400.13 |
| 2011/0050140 A1 * | 3/2011 | Sakai ....................... H02P 9/30 318/400.36 |
| 2011/0062908 A1 | 3/2011 | Kitanaka |
| 2011/0084638 A1 | 4/2011 | Patel et al. |
| 2011/0109155 A1 | 5/2011 | Anwar et al. |
| 2011/0181232 A1 | 7/2011 | Krishnamoorthy et al. |
| 2012/0038300 A1 | 2/2012 | Kato et al. |
| 2012/0268056 A1 | 10/2012 | Liu |
| 2013/0069572 A1 * | 3/2013 | Maekawa ........... H02P 21/0042 318/400.14 |
| 2013/0153180 A1 | 6/2013 | Montocchio et al. |
| 2014/0197774 A1 | 7/2014 | Liu et al. |
| 2014/0228980 A1 | 8/2014 | Ohta et al. |
| 2014/0312811 A1 | 10/2014 | Liu et al. |
| 2015/0002059 A1 | 1/2015 | Liu et al. |
| 2015/0002067 A1 | 1/2015 | Rowan et al. |
| 2015/0123579 A1 | 5/2015 | Liu et al. |

FOREIGN PATENT DOCUMENTS

| | | |
|---|---|---|
| CN | 201504207 U | 6/2010 |
| CN | 101950983 A | 1/2011 |
| CN | 102045021 A | 5/2011 |
| CN | 102349230 A | 2/2012 |
| CN | 202872721 U | 4/2013 |
| CN | 103190068 A | 7/2013 |
| EP | 1635448 A1 | 3/2006 |
| EP | 1868288 A1 | 12/2007 |
| GB | 2390766 A | 1/2004 |
| JP | 2001-025282 | 1/2001 |
| JP | 2002034289 A | 1/2002 |
| WO | WO2009093214 A2 | 7/2009 |

OTHER PUBLICATIONS

Miranda et al., "Sensorless Control of a PMSM Synchronous Motor at Low Speed"; IEEE Industrial Electronics; IECON 2006; $32^{nd}$ Annual Conf., IEEE; Piscataway, NJ; Nov. 1, 2006; pp. 5069-5074.

Yim et al., "A Predictive Current Control Associated to EKF for High Performance IPMSM Drives"; Applied Power Electronics Conf. and Exposition (APEC), 2011; $26^{th}$ Annual IEEE, Mar. 6, 2011; pp. 1010-1016.

Moldovan et al., "Active-Flux Based, V/f-With-Stabilizing-Loops Versus Sensorless Vector Control of IPMSM Drives"; Industrial Electronics (ISIE); 2011 IEEE Int'l Symposium; Jun. 27, 2011; pp. 514-519.

Stirban et al., "Motion-Sensorless Control of BLDC-PM Motor With Offline FEM-Information-Assisted Position and Speed Observer"; IEEE Transactions on Industry Applications; IEEE Service Center, Piscataway, NJ; vol. 48, No. 6; Nov. 1, 2012; pp. 1950-1958.

Carpaneto, et al., "A New Sensorless Permanent Magnet Synchronous Motor Algorithm Based on Algebraic Method"; $13^{th}$ European Conf. on Power Electronics and Applications, 2009; EPE 2009; Sep. 8-10, 2009, Barcelona, Spain; IEEE, Piscataway, NJ, Sep. 8, 2009, pp. 1-10.

"Guidelines for the Use of 400-600 Volt AC Drives in Medium Voltage Applications," Yaskawa Application Note, Jun. 7, 2005.

Agarlita, Sorin-Cristian et al., "I-f Starting and Active Flux Based Sensorless Vector Control of Reluctance Synchronous Motors, with Experiments", $12^{th}$ Int'l Conf. on Optimization of Electrical and Electronic Equipment, OPTIM 2010, pp. 337-342.

Andreescu, G., et al. "Stable V/f Control System with Unity Power Factor for PMSM Drives", IEEE $13^{th}$ Int'l Conf. on Optimization of Electrical and Electronic Equipment (OPTIM), May 2012, pp. 432-438.

Batzel, Todd D. et al., "*Electric Propulsion With Sensorless Permanent Magnet Synchronous Motor: Implementation and Performance*", IEEE Transactions on Energy Conversion, vol. 20, No. 3, pp. 575-583, Sep. 2005.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Fatu et al., I-F Starting Method With Smooth Transition to EMF Based Motion-Sensorless Vector Control of PM Synchronous Motor/Generator, 2008, IEEE, pp. 1481-1487.

Halkassari, Optimal U/F-Control of High Speed Permanent Magnet Motors, 2006, IEEE, pp. 2302-2308.

Iepure, Livid Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.

J. Liu et al., "Rotor Position Estimation for Synchronous Machines Based on Equivalent EMF", IEEE Transactions on Industry Applications, vol. 47, pp. 1310-1318, May-Jun. 2011.

J'aitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.

Kiuchi, M., et al, "V/f Control of Permanent Magnet Synchronous Motors Suitable for Home Appliances by DC-link Peak Current Control Method", The Jun. 2010 Int'l Power Electronics Conference, IEEE 2010, pp. 567-573.

Kojima, Mari et al., "*Novel Vector Control System Using Deadbeat-Controlled PWM Inverter With Output LC Filter*", IEEE Transactions on Industry Applications, vol. 40, No. 1, pp. 162-169, Jan./Feb. 2004.

(56) References Cited

OTHER PUBLICATIONS

Kukrer, "Deadbeat Control of a Three-Phase Inverter with an Output LC Filter", IEEE Transactions on Power Electronics, vol. 11, No. 1, Jan. 1996, 8 pgs.

Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.

Loh, Poh Chiang et al., "*Analysis of Multiloop Control Strategies for LC/CL/LCL-Filtered Voltage-Source and Current-Source Inverters*", IEEE Transactions on Industry Applications, vol. 41, No. 2, pp. 644-654, Mar./Apr. 2005.

Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.

Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.

Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.

Nakamura, Yoshlnobu et al., "High-Efficiency Drive Due to Power Factor Control of a Permanent Magnet Synchronous Motor", IEEE Transactions on Power Electronics, vol. 10, No. 2, Mar. 1995, Manuscript rec'd Aug. 22, 1992, revised Sep. 13, 1994, pp. 247-253.

Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.

Park et al., "Design and Control of High-Speed Solid-Rotor Synchronous Reluctance Drive With Three-Phase LC Filter", Conference Record of the 2005 IEEE Industry Applications Conf. 40$^{th}$ IAS Annual Meeting, vol. 1, Oct. 2, 2005, pp. 715-722.

Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.

Ryvkin, S. et al., "Sensorless Oil Drowned Pump Drive", IEEE ISIE 2005, Jun. 20-23, 2005, Dubrovnik, Croatia, pp. 963-968.

Salomäki, J. et al., "*Sensorless Control of Induction Motor Drives Equipped With Inverter Output Filter*", IEEE Transactions on Industrial Electronics, vol. 53, No. 4, pp. 1188-1197, Aug. 2006.

Salomäki, J. et al., "*Sensorless Vector Control of PMSM Drives Equipped With Inverter Output Filter*", in Proceedings of the 32$^{nd}$ Annual Conference of the IEEE Industrial Electronics Society (IECON 2006), Paris, France, pp. 1059-1064.

Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.

Kim et al., "PWM Switching Frequency Signal Injection Sensorless Methods in IPMSM", IEEE, 2011, pp. 3021-3028.

Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet 11-26-2-14, 1 pg.

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

Kobayashi et al., "Investigation of IPMSM's Position Estimation in Low Speed Region with DC Link Current Detection", IEEE Jan. 2007, pp. 1411-1416.

Stirban et al., "Motion-Sensorless Control of BLDC-PM Motor With Offline FEM Information Assisted State Observer"; Optimization of Electrical and Electronic Equipment (OPTIM), 2010 12$^{th}$ International Conference, MA 22, 2010, pp. 321-328.

\* cited by examiner

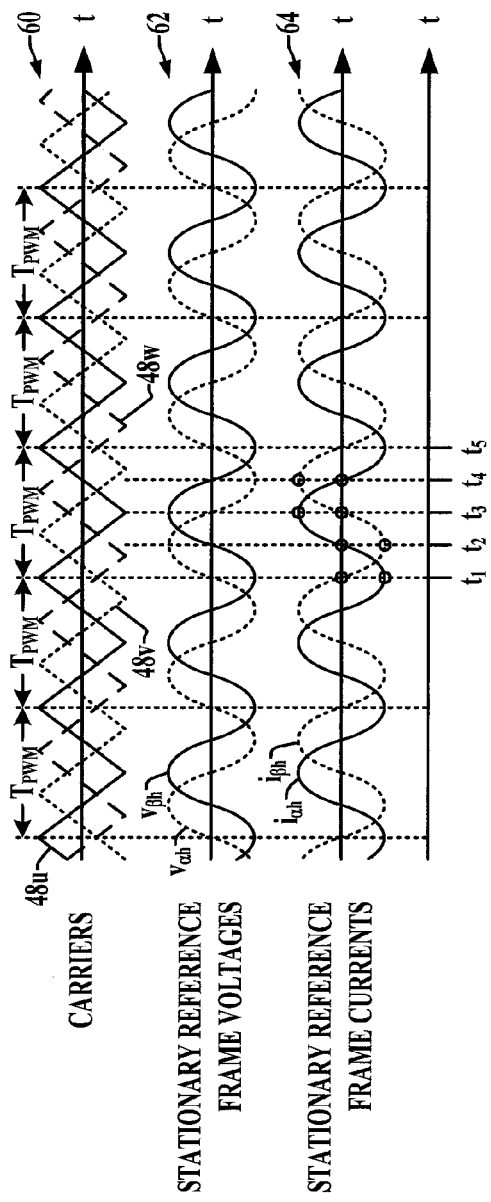
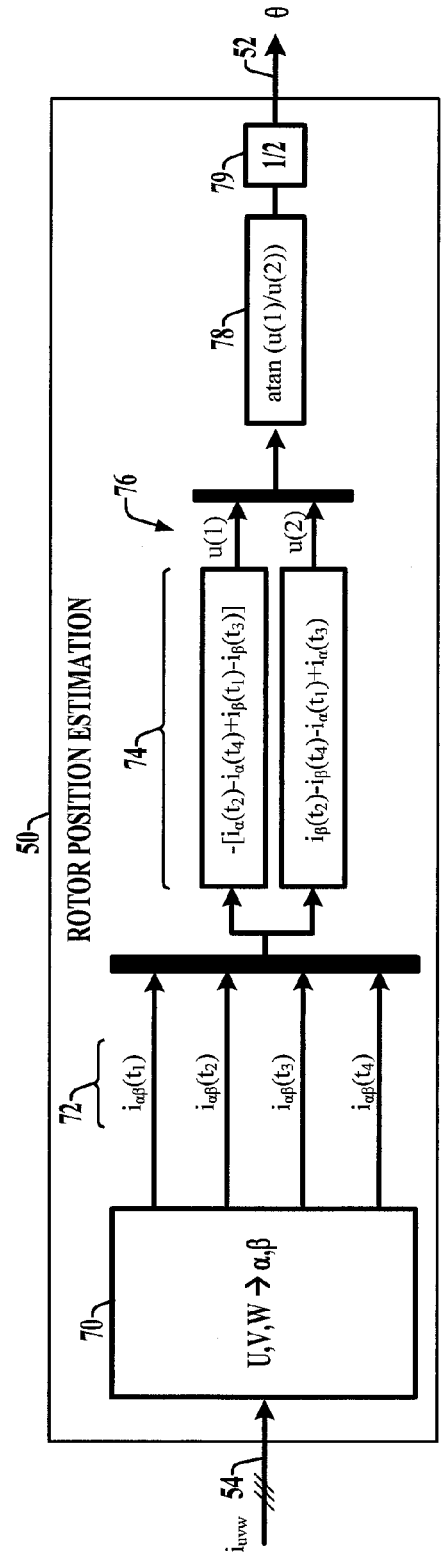
FIG. 2
FIG. 3

ROTOR POSITION ESTIMATION APPARATUS AND METHODS

TECHNICAL FIELD

The subject matter disclosed herein relates to power conversion, and more specifically to rotor position estimation apparatus and techniques for motor drive power converters.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides motor drives, estimation systems therefor and methods for estimating a motor load rotor position in which four sets of inverter output current samples obtained at four different sample times in a given inverter PWM cycle are converted into a corresponding stationary reference frame current value pairs and the rotor position estimate is computed at least partially according to the stationary reference frame current values.

BRIEF DESCRIPTION OF THE DRAWINGS

The following description and drawings set forth certain illustrative implementations of the disclosure in detail, which are indicative of one or more exemplary ways in which the various principles of the disclosure may be carried out. The illustrated examples are not exhaustive of the many possible embodiments of the disclosure. Various objects, advantages and novel features of the disclosure will be set forth in the following detailed description when considered in conjunction with the drawings, in which:

FIG. 2 is a graph;
FIG. 3 is a schematic diagram.

DETAILED DESCRIPTION

Figure 1:
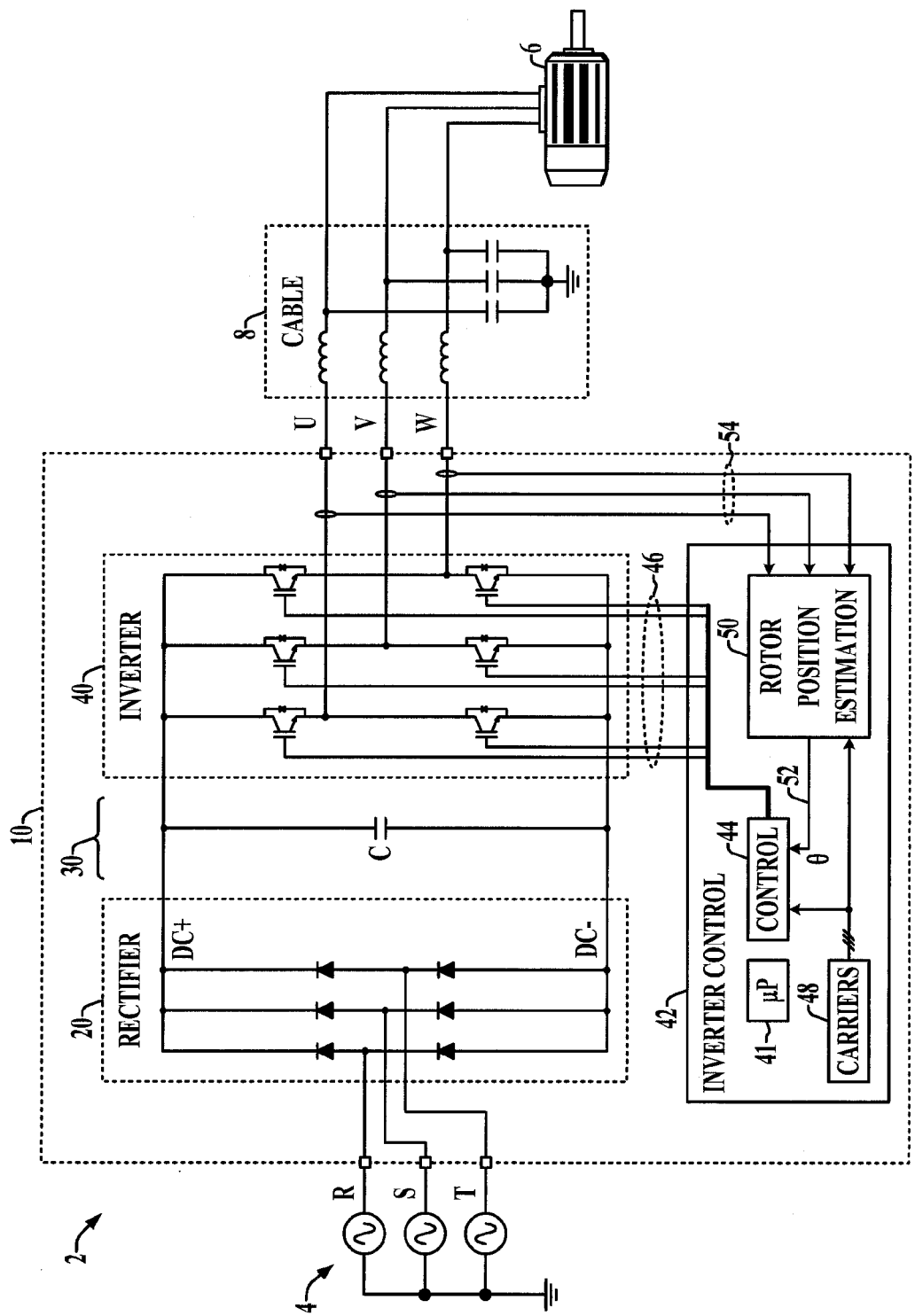
FIG. 1 is a schematic system diagram.

FIG. 1 illustrates a power conversion system 2 including a motor drive 10 with an input rectifier 20 having AC input lines R, S and T receiving multiphase AC input power from a source 4. The rectifier 20 provides DC output power via first and second DC output nodes or terminals (e.g., DC+ and DC−) to an intermediate DC link circuit 30 including a DC link capacitance C. The motor drive 10 further includes an output inverter 40 receiving DC input power from the DC link circuit 30, where the inverter 40 includes IGBTs or other inverter switching devices individually coupled between a corresponding DC link circuit node and a corresponding one of three AC output nodes or terminals U, V and W. Any suitable inverter switching devices may be used, including without limitation insulated gate bipolar transistors (IGBTs), silicon controlled rectifiers (SCRs), gate turn-off thyristors (GTOs), integrated gate commutated thyristors (IGCTs), etc. The inverter switching devices are operated according to inverter switching control signals 46 from an inverter controller 42 in order to convert DC power from the link circuit 30 to provide multiphase, variable frequency, variable amplitude AC output power to drive an associated motor load 6 coupled with the output inverter 40 of the motor drive 10 via a cable 8.

The various aspects of the present disclosure are hereinafter described in connection with a three-phase output inverter 40, although different embodiments are contemplated involving more than three output phases to drive an AC motor load 6. As seen in FIG. 1, the motor drive 10 receives multiphase AC input power from a three-phase source 4, although embodiments are possible using single-phase input power and/or multiphase input power from a source 4 having more than three phases. In the illustrated embodiment, moreover, a passive rectifier circuit 20 is included in the illustrated motor drive 10, although other implementations are possible in which a motor drive system 10 receives DC input power from an external source and/or where an active rectifier 20 is used. In addition, the illustrated motor drive 10 is a voltage source converter architecture having a DC bus circuit connected to, the output terminals of the rectifier 20, with the capacitance C connected between the positive and negative DC bus terminals DC+ and DC−, although other embodiments are possible in which a current source converter configuration is used, for example, having an intermediate DC link circuit 30 providing a regulated DC link current to the inputs of the inverter 40, and the DC link circuit 30 may include one or more DC link chokes or inductances (not shown). As further shown in FIG. 1, the cable 8 provides an impedance including inductance and capacitance between the output of the inverter 40 and the driven motor 6, and various implementations of a motor drive system 2 may include an output filters and/or transformers (not shown) coupled between the motor drive 10 and the motor load 6.

The inverter switching devices are individually connected between one of the DC bus terminals DC+ and DC− and the corresponding AC output phase U, V or W, and are operative according to a corresponding one of a plurality of switching control signals 46 from the inverter controller 42 in order to selectively electrically connect or disconnect the corresponding DC terminal to/from the corresponding AC output line. In practice, the controller 42 provides inverter switching control signals 46 to the corresponding inverter switches in a manner suitable for conversion of the input DC electrical power to variable frequency, variable amplitude AC output power suitable for controlling operation of the connected motor load 6. In this regard, the inverter controller 42 provides the switching control signals 46 in order to implement a desired control strategy, for example, control or regulation of the motor operation according to one or more setpoint inputs (not shown), such as a desired motor speed, torque, position, etc., and the controller 42 may employ one or more feedback signals to implement the control strategy in a closed loop fashion. In this regard, the motor drive 10 includes current sensors providing inverter output current feedback signals or values 54 to the inverter controller 42, and the illustrated controller 42 includes or implements an inverter control circuit or component 44, such as signal conditioning and driver circuitry with associated logic circuits and/or programming of a processor 41 providing suitable switching control signals 46 for selectively operating the inverter switching devices, as well as an associated non-transitory electronic memory storing data values and programming instructions.

In one embodiment, moreover, the control circuit or component 44 implements closed loop control of the inverter 40 in order to control operation of the driven motor load 6 at least partially according to an estimated rotor position angle θ 52 using a sine-triangle pulse width modulation technique in which a desired inverter output parameter (e.g., output voltage command signal or value) for each output phase U, V and W is compared with a corresponding triangle wave carrier 48 to determine the desired on or off state for the inverter switching devices associated with each given phase. The modulation can be implemented in hardware using comparators, triangle waveform generators, etc. and/or comparison of the carrier 48 and desired output value for a corresponding inverter output phase may be implemented in software/firmware executed by the processor 41, with the corresponding carrier waveforms 48 being stored in the electronic memory and/or otherwise implemented in processor-executed software and/or firmware.

The controller 42 and the components thereof can include suitable logic or processor-based circuitry and an electronic memory storing data and programming code, and may also include signal level amplification and/or driver circuitry (not shown) to provide suitable drive voltage and/or current levels via the signals 46 sufficient to selectively actuate the inverter switching devices, for instance, such as comparators, carrier wave generators or digital logic/processor elements and signal drivers or combinations thereof. Moreover, the controller 42 can provide the switching control signals 46 according to any suitable pulse width modulation (PWM) technique, including without limitation carrier-based pulse width modulation, etc., which performs normal motor control tasks, including pulse width modulation operation of the inverter switches.

Referring now to FIGS. 1-5, the inventors have appreciated that various motor drive applications involve somewhat lengthy cables 8 and/or other intervening structures (e.g., transformers, filters, etc.) making direct measurement of the position of the rotor difficult or impractical. Accordingly, the controller 42 further implements a rotor position estimation system 50, which can be a separate circuit configured with a suitable electronic processor, or may be implemented by the inverter controller processor 41 in certain embodiments.

A graph 60 in FIG. 2 illustrates phase shifted carriers 48$u$, 48$v$ and 48$w$ employed by the inverter controller 42 in generating the pulse width modulated inverter switching control signals 46 for the AC output phases U, V and W, respectively, where the carriers 48 are phase shifted 120° relative to one another as shown in the graph 60 in one embodiment. In this manner, high frequency signals are inserted into the AC output power delivered to the motor load 6 at a frequency generally corresponding to the inverter pulse width modulation frequency. The phase shifting of the carriers 48 need not be exactly 120°, for example, where the phase shifting is generally 360°/X, where X is an integer corresponding to the number of output phases provided by the inverter 40. Moreover, phase shifting within one or two or several degrees of 120° may be used, with the ultimately estimated rotor position being offset based on the difference between the carrier phase shifting and 120°. The illustrated embodiments provide triangular carrier waveforms, although other embodiments are possible using carriers of different waveform shapes, and the concepts of the present disclosure are not limited to implementations using triangular carrier waveforms. Furthermore, the carriers 48 and the use thereof in generating pulse width modulated switching control signals 46 to operate the inverter 40 can be implemented using any suitable modulation technique, wherein the carriers 48 can be implemented using analog circuitry, lookup tables, parametric equations, or other suitable techniques or combinations thereof.

The graph 60 in FIG. 2 further illustrates several example inverter PWM cycles having a corresponding PWM period $T_{PWM}$. In one possible implementation, the PWM frequency employed by the inverter controller 42 is in the range of 1 kHz or more, although the concepts of the present disclosure can be employed in association with any suitable PWM frequency having a corresponding PWM period $T_{PWM}$, and the PWM switching frequency may be fixed or adjustable in various embodiments.

FIG. 2 further provides a graph 62 illustrating example α-β stationary reference frame PWM-frequency voltages $v_{\alpha h}$ and $v_{\beta h}$ applied to the motor load 6, as well as a graph 64 showing α-β stationary reference frame currents $i_{\alpha h}$ and $i_{\beta h}$ corresponding to the u, v, w stationary reference frame inverter output current signals or values 54 measured or sensed at the output of the inverter 40. As further seen in FIG. 2, the rotor position estimation system 50 is provided with four sets of inverter output current samples $i_{uvw}(t_i)$ obtained at four different sample times ($t_1$, $t_2$, $t_3$, $t_4$) in a given inverter pulse width modulation cycle, and the system 50 uses these to estimate the rotor position θ representing the angular position of the rotor of the driven motor load 6 as detailed further below.

The controller 42 obtains the inverter output current samples 54 using any suitable sampling technique. For example, analog sensors can provide phase current signals 54 to an analog to digital (A/D) converter (not shown) of the controller 42 which provides for conversions to generate corresponding sample values at the sample times $t_1$, $t_2$, $t_3$ and $t_4$, where multiple converters may be used and/or sample and hold (S/H) circuitry (not shown) can be provided such that the phase currents $i_{uvw}(t_i)$ are obtained concurrently or approximately concurrently for each of the inverter output phases ϕ=U, V and W corresponding to the four different sample times $t_1$, $t_2$, $t_3$ and $t_4$ in a given inverter pulse width modulation cycle. Moreover, as shown in the example of FIG. 2, the four sets of multiphase inverter output current samples $i_{uvw}(t_i)$ are obtained or sampled approximately at 90° intervals in each given inverter pulse width modulation cycle.

In various implementations, the sampling may be somewhat skewed, with a shared A/D converter in certain implementations sampling and converting signals 54 from the phase current sensors serially using a multiplexer, etc., whereby the samples need not be obtained exactly at 90° intervals in all embodiments. Any suitable sampling control configuration can be used, for example, with the processor 41 controlling the sampling by operation of the conversion circuitry, with the processor 41 in certain embodiments also controlling the provision of the inverter switching control signals 46 and controlling the correspondence between the switching control signal generation and the inverter output current sampling. In certain embodiments, moreover, the current sensors measuring the inverter output currents may provide digital values, with the processor 41 controlling the timing of the sampling by operative interconnection with the current sensors. In this regard, the rotor position estimation system 50 may be implemented by the processor 41, with logic of the estimation system 50 controlling the sampling of the inverter output current signals or values 54.

In the illustrated embodiment, moreover, the inverter output current sampling is done in correspondence with one of the inverter output carriers 48, in this case, the carrier 48$u$. As seen in FIG. 2, for example, the sample times $t_1$, $t_2$, $t_3$ and $t_4$ correspond to approximately the peaks, valleys and midpoints of the carrier 48$u$. Thus, the carriers 48 themselves are offset from one another by 120° in the illustrated three-phase example, whereas the sampling times $t_1$, $t_2$, $t_3$ and $t_4$ are offset by approximately 90° for the illustrated three-phase implementation, and the same sampling offset (approximately 90°) is used in multiphase inverter output embodiments having more than three output phases. Any suitable carriers 48 can be used having a peak, a valley and two midpoints generally equally approximately 90° in each PWM cycle of the inverter 40, including without limitation the illustrated triangular waveforms 48u, 48v and 48w, wherein the concepts of the present disclosure are not limited to the illustrated example carriers 48. In operation, the estimation system or component 50 estimates the motor rotor angular position θ by computations using stationary reference frame current values shown in the graph 64 at the sample times $t_1$, $t_2$, $t_3$ and $t_4$, where the stationary reference frame current values are computed by the system 50 based on the sample signals or values 54 $i_{uvw}(t_i)$ obtained at the four sample times in a given PWM cycle.

The estimation system or component 50 in one embodiment provides an estimated rotor position signal or value θ in each PWM cycle, although the estimation can be done less frequently in other embodiments. In addition, the estimated rotor position θ can be provided for use by the closed loop control component 44 in generating the inverter switching control signals 46 (e.g., as feedback for position and/or speed control or regulation functions) and/or the position can be used for other purposes, including provision of a digital value and/or analog signal to an external system or network (not shown). Moreover, the illustrated example provides the rotor position estimate θ as a digital value 52 resulting from computations implemented by the processor 41, although other embodiments are possible in which the estimate θ can be provided by the system 50 as an analog signal or in another usable form.

Figure 5:
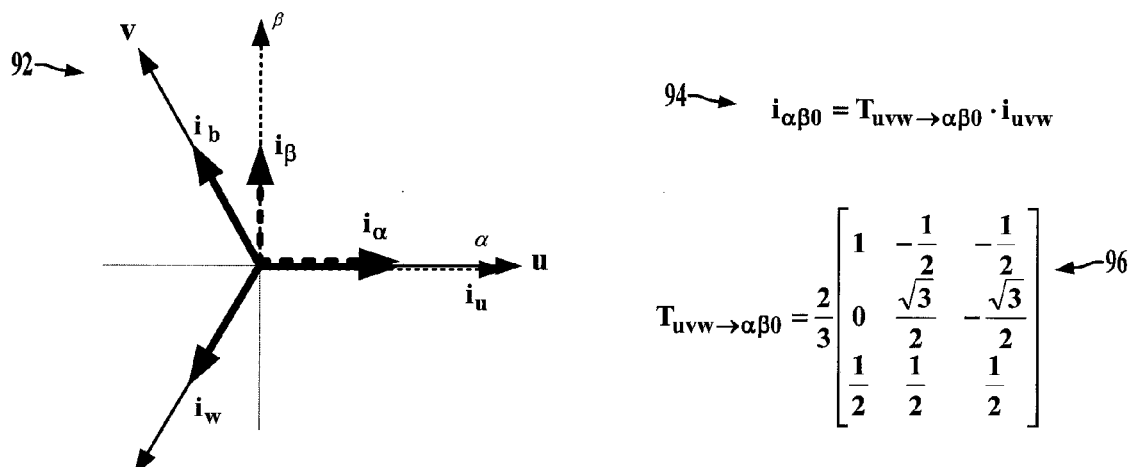
FIG. 5 is a graph.

In operation, the estimation system 50 converts four sets of multiphase inverter output current samples $i_{uvw}(t_i)$ for a given PWM cycle of the inverter 40 into four corresponding pairs of stationary reference frame current values $i_\alpha(t_i)$, $i_\beta(t)$ for each of the sample times $t_i = t_1$, $t_2$, $t_3$, $t_4$ using any suitable reference frame conversion technique, including without limitation the conversion or transformation example illustrated in FIG. 5 below.

FIG. 3 schematically illustrates further details of one non-limiting implementation of the rotor position estimation system or component 50, receiving the inverter output current samples 54 as signals or values ($i_{uvw}$), with a conversion circuit or component 70 providing conversion from the U, V, W reference frame to the stationary α-β reference frame to produce the four corresponding pairs of stationary reference frame current values 72 ($i_{\alpha\beta}(t_1)$, $i_{\alpha\beta}(t_2)$, $i_{\alpha\beta}(t_3)$ and $i_{\alpha\beta}(t_4)$). The system 50 computes numerator and denominator summations 74 to compute numerator and denominator values 76 as shown (numerator $u(1) = -[i_\alpha(t_2) - i_\alpha(t_4) + i_\beta(t_1) - i_\beta(t_3)]$ and denominator $u(2) = [i_\beta(t_2) - i_\beta(t_4) - i_\alpha(t_1) + i_\alpha(t_3)]$ in one embodiment). Computation circuits or components 78 and 79 compute the rotor position estimate value θ 52 according to the following equation (1):

$$\theta = 0.5 \tan^{-1}\left(\frac{u(1)}{u(2)}\right). \quad (1)$$

By this operation, the rotor position estimation system or component 50 computes the estimated rotor position θ for a given inverter PWM cycle at least partially according to the stationary reference frame current values $i_\alpha(t_i)$, $i_\beta(t_i)$ for that PWM cycle. Moreover, as the controller 42 provides the inverter PWM switching control signals 46 using phase shifted carriers 48 for the inverter output phases U, V and W, the resulting high frequency signal content (e.g., at the inverter PWM switching frequency) facilitates computation of the rotor position estimate θ without requiring encoders or other position sensors at the motor load 6, and without measuring motor currents or voltages on the load side of the cable 8. Moreover, the techniques of the present disclosure advantageously use only four samples of the inverter output currents 54 in a given PWM cycle of the inverter 40, and utilize simple mathematical operations for the computed numerator and denominator values 74, 76, providing computational advantages compared with other position estimation techniques.

Figure 4:
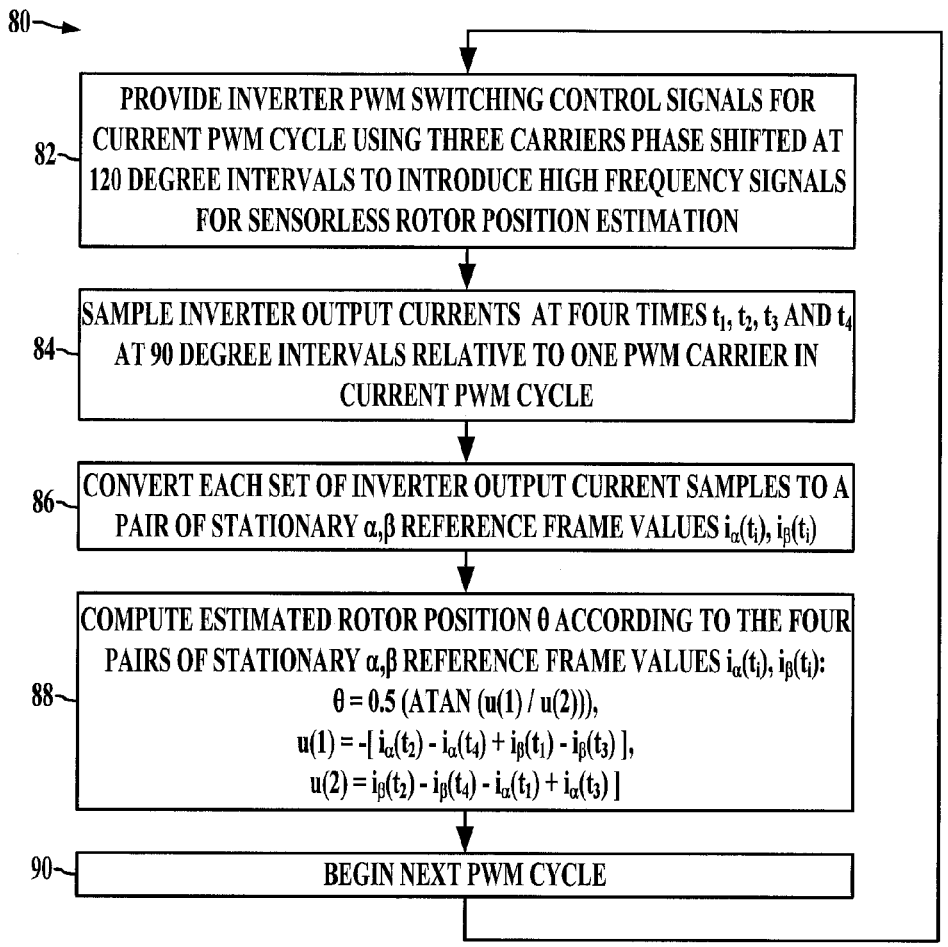
FIG. 4 is a flow diagram.

FIG. 4 depicts a process or method 80 for estimating a rotor position θ of a motor load 6 driven by an inverter 40, which may be implemented using the estimation system 50 of FIGS. 1 and 3 in one embodiment. Although the method 80 is illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. Furthermore, not all illustrated steps may be required to implement a process or method in accordance with the present disclosure, and one or more such acts may be omitted and/or combined. The illustrated methods and other methods of the disclosure may be implemented in hardware, processor-executed software, processor-executed firmware, programmable logic, etc. or combinations thereof, in order to provide rotor position estimation functionality described herein, and may be employed in any power conversion system including but not limited to the above illustrated motor drive 10, wherein the disclosure is not limited to the specific applications and embodiments illustrated and described herein. Moreover, the present disclosure involves non-transitory computer readable mediums, such as an electronic memory of the controller 42 in FIG. 1, having computer executable instructions for implementing the various rotor position estimation processes and methods described herein, including the process 80 of FIG. 4.

The flow diagram of FIG. 4 illustrates an exemplary PWM cycle during operation of the motor drive, wherein the position estimation aspects of the process 80 may be implemented in all inverter PWM cycles, or selectively in less than all such PWM cycles in various embodiments. At 82 in FIG. 4, the controller 42 provides inverter PWM switching control signals 46 for the current or present PWM cycle using three carriers 48 that are phase shifted at 120° relative to one another in order to introduce high-frequency signals or components for sensorless rotor position estimation. At 84, the controller 42 (e.g., the processor 41 implementing the rotor position estimation component or system 50 in one example) samples the inverter output currents 54 at four different sample times $t_1$, $t_2$, $t_3$ and $t_4$ during the present PWM cycle. In the illustrated embodiment, for example, the inverter output currents 54 are sampled at 84 at 90° intervals of the 360° duration of the current PWM cycle. In addition, the sampling in certain embodiments (e.g., FIG. 2 above) is correlated with one of the phase-shifted carriers 48, such as carrier 48u, with the samples being obtained approximately at the peaks, valleys and midpoints of the selected carrier 48u in the given PWM cycle. Thus, at each sampling time $t_1$, $t_2$, $t_3$ and $t_4$, a set of three inverter output current signals or values 54 is obtained at 84.

Referring also to FIG. 5, the four sets of three samples 54 for the current PWM cycle are converted at 86 in FIG. 4 in order to provide four pairs of α-β stationary reference frame current values $i_\alpha(t_i)$, $i_\beta(t_i)$ for i=1, 2, 3 and 4. FIG. 5 illustrates one suitable stationary reference frame conversion process which may be employed for the conversion at 86, in which a graph 92 shows an u, v, w reference frame with an overlay of the α-β stationary reference frame, and the stationary reference frame current values $i_\alpha(t_i)$, $i_\beta(t_i)$ are computed according to the following equations (2) and (3) (e.g., shown at 94 and 96 in FIG. 5):

$$i_{\alpha\beta0} = T_{uvw \to \alpha\beta0} \cdot i_{uvw}, \text{ where} \qquad (2)$$

$$T_{uvw \to \alpha\beta0} = \frac{2}{3}\begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix}. \qquad (3)$$

Thereafter at 88 in FIG. 4, the estimated rotor position θ is computed according to the four pairs of stationary α-β reference frame values obtained at 86 (e.g., using the above equation (1)). Thereafter at 90, the next PWM cycle begins, with the process 80 returning to 82-88 as described above.

The inventors have appreciated that the voltages $v_\alpha$ and $v_\beta$ of a permanent magnet (PM) motor in the a-β stationary reference frame are as follows:

$$\begin{bmatrix} v_\alpha \\ v_\beta \end{bmatrix} = R \cdot \begin{bmatrix} i_\alpha \\ i_\beta \end{bmatrix} + \begin{bmatrix} L_0 + L_1 \cos 2\theta & L_1 \sin 2\theta \\ L_1 \sin 2\theta & L_0 - L_1 \cos 2\theta \end{bmatrix} \frac{d}{dt}\begin{bmatrix} i_\alpha \\ i_\beta \end{bmatrix} +$$

$$\left(\frac{d}{dt}\begin{bmatrix} L_0 + L_1 \cos 2\theta & L_1 \sin 2\theta \\ L_1 \sin 2\theta & L_0 - L_1 \cos 2\theta \end{bmatrix}\right) \cdot \begin{bmatrix} i_\alpha \\ i_\beta \end{bmatrix} +$$

$$\omega \lambda_{pm}\begin{bmatrix} -\sin\theta \\ \cos\theta \end{bmatrix}, \text{ where } L_0 = \frac{L_q + L_d}{2}, L_1 = \frac{L_d - L_q}{2}.$$

$L_q$ is the torque-axis (q-axis) self inductance, and $L_d$ is the flux-axis (d-axis) self inductance.

The carrier frequency components are given as follows:

$$\begin{bmatrix} v_{\alpha h} \\ v_{\beta h} \end{bmatrix} = \begin{bmatrix} L_0 + L_1 \cos 2\theta & L_1 \sin 2\theta \\ L_1 \sin 2\theta & L_0 - L_1 \cos 2\theta \end{bmatrix} \frac{d}{dt}\begin{bmatrix} i_{\alpha h} \\ i_{\beta h} \end{bmatrix} = L \cdot \frac{d}{dt}\begin{bmatrix} i_{\alpha h} \\ i_{\beta h} \end{bmatrix}.$$

Defining the carrier frequency voltages in the α-β stationary reference frame as follows:

$$\begin{bmatrix} v_{\alpha h} \\ v_{\beta h} \end{bmatrix} = V_h \begin{bmatrix} \cos \omega_h t \\ \sin \omega_h t \end{bmatrix},$$

where "$\omega_h$" is the carrier frequency component, the α-β reference frame currents are given by the following:

$$\begin{bmatrix} i_{\alpha h} \\ i_{\beta h} \end{bmatrix} = L^{-1} \int \begin{bmatrix} v_{\alpha h} \\ v_{\beta h} \end{bmatrix} =$$

$$\frac{V_h}{\omega_h(L_0^2 - L_1^2)}\begin{bmatrix} L_0 - L_1 \cos 2\theta & -L_1 \sin 2\theta \\ -L_1 \sin 2\theta & L_0 + L_1 \cos 2\theta \end{bmatrix} \cdot \begin{bmatrix} \sin \omega_h t \\ -\cos \omega_h t \end{bmatrix},$$

where $$i_{\alpha h} = \frac{V_h[(L_0 - L_1 \cos 2\theta) \cdot \sin \omega_h t + L_1 \sin 2\theta \cdot \cos \omega_h t]}{\omega_h(L_0^2 - L_1^2)}, \text{ and}$$

$$i_{\beta h} = \frac{-V_h[L_1 \sin 2\theta \cdot \sin \omega_h t + (L_0 + L_1 \cos 2\theta) \cdot \cos \omega_h t]}{\omega_h(L_0^2 - L_1^2)}$$

The α-axis and β-axis current is detected at the peak and valley of a carrier ($\cos \omega_h t = 0$) as follows:

$$i_\alpha = i_{\alpha f} \mp \frac{V_h(L_0 - L_1 \cos 2\theta)}{\omega_h(L_0^2 - L_1^2)}, \text{ and } i_\beta = i_{\beta f} \pm \frac{V_h(L_1 \sin 2\theta)}{\omega_h(L_0^2 - L_1^2)}.$$

The α-axis and β-axis current is also detected at the mid points ($\sin \omega_h t = 0$) as follows:

$$i_\alpha = i_{\alpha f} \pm \frac{V_h(L_1 \cos 2\theta)}{\omega_h(L_0^2 - L_1^2)}, \text{ and } i_\beta = i_{\beta f} \mp \frac{V_h(L_0 + L_1 \sin 2\theta)}{\omega_h(L_0^2 - L_1^2)}.$$

The difference between the α-axis and β-axis at $\cos \omega_h t = 0$ is as follows:

$$i_\alpha(t_1) - i_\alpha(t_3) = i_{\alpha 1} = -\frac{2V_h(L_0 - L_1 \cos 2\theta)}{\omega_h(L_0^2 - L_1^2)}, \text{ and}$$

$$i_\beta(t_1) - i_\beta(t_3) = i_{\beta 1} = \frac{2V_h(L_1 \sin 2\theta)}{\omega_h(L_0^2 - L_1^2)}$$

The difference between the α-axis and β-axis at $\sin \omega_h t = 0$ is as follows:

$$i_\alpha(t_2) - i_\alpha(t_4) = i_{\alpha 2} = \frac{2V_h(L_1 \sin 2\theta)}{\omega_h(L_0^2 - L_1^2)}, \text{ and}$$

$$i_\beta(t_2) - i_\beta(t_4) = i_{\beta 2} = -\frac{2V_h(L_0 + L_1 \cos 2\theta)}{\omega_h(L_0^2 - L_1^2)}.$$

This yields the following formula for the rotor position θ (e.g., equation (1) above):

$$\theta = 0.5 \tan^{-1}\left(\frac{u(1)}{u(2)}\right), \text{ where:}$$

$$u(1) = -(i_{\alpha 2} + i_{\beta 1}) = -\frac{4V_h(L_1 \sin 2\theta)}{\omega_h(L_0^2 - L_1^2)},$$

$$u(2) = i_{\beta 2} - i_{\alpha 1} = -\frac{4V_h(L_1 \cos 2\theta)}{\omega_h(L_0^2 - L_1^2)}, \text{ and}$$

$$k_1 = \frac{-4V_h L_1}{\omega_h(L_0^2 - L_1^2)},$$

where $k_1 > 0$ for interior permanent magnet (IPM) motors 6.

As seen above, therefore, the estimation system or component 50 advantageously provides position information for use in motor control via the controller 42 and/or for any other suitable usage in the drive 10 and/or an external system or network at least partially according to the four sets of multiphase inverter output current samples for a given PWM cycle of the inverter 40.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". This description uses examples to disclose various embodiments and also to enable any person skilled in the art to practice the disclosed subject matter, including making and using any devices or systems and performing any incorporated methods. It will be evident that various modifications and changes may be made, and additional embodiments may be implemented, without departing from the broader scope of the present disclosure as set forth in the following claims, wherein the specification and drawings are to be regarded in an illustrative rather than restrictive sense.

The following is claimed:

1. An estimation system for estimating a rotor position of a motor load driven by an inverter, wherein the estimation system:
   converts each of four sets of multiphase inverter output current samples obtained at four different sample times in a given inverter pulse width modulation cycle into a corresponding pair of stationary reference frame current values, the given inverter pulse width modulation cycle having a duration equal to a complete cycle of a carrier waveform used in generating pulse width modulated switching signals to control an output of the inverter, and
   computes an estimated rotor position for the given inverter pulse width modulation cycle according to the stationary reference frame current values for the given inverter pulse width modulation cycle;
   wherein the four sets of multiphase inverter output current samples are sampled by the estimation system approximately at peaks, valleys and mid-points of one of a plurality of phase shifted carriers used to operate the inverter in the given inverter pulse width modulation cycle wherein a control circuit implements closed loop control of the inverter to control operation of the motor load at least partially according to the estimated rotor position.

2. The estimation system of claim 1, wherein the four sets of multiphase inverter output current samples are sampled approximately at 90° intervals in the given inverter pulse width modulation cycle.

3. The estimation system of claim 1, wherein the estimation system:
   computes the estimated rotor position θ for the given inverter pulse width modulation cycle according to α-β stationary reference frame current value pairs $i_{\alpha i}$ and $i_{\beta i}$ for the four sample times ($t_1$, $t_2$, $t_3$ and $t_4$) according to the following equation:

$$\theta = 0.5 \tan^{-1}\left(\frac{u(1)}{u(2)}\right), \text{ where:}$$

$$u(1) = -(i_{\alpha 2} + i_{\beta 1}),$$

$$u(2) = i_{\beta 2} - i_{\alpha 1},$$

$$i_{\alpha 1} = i_\alpha(t_1) - i_\alpha(t_3),$$

$$i_{\beta 1} = i_\beta(t_1) - i_\beta(t_3),$$

$$i_{\alpha 2} = i_\alpha(t_2) - i_\alpha(t_4), \text{ and}$$

$$i_{\beta 2} = i_\beta(t_2) - i_\beta(t_4);$$

4. The estimation system of claim 3, wherein the four sets of multiphase inverter output current samples are sampled approximately at 90° intervals in the given inverter pulse width modulation cycle.

5. A motor drive, comprising:
   a multiphase inverter comprising a plurality of inverter switching devices individually coupled between an inverter DC input and a multiphase inverter AC output;
   a controller providing pulse width modulated switching control signals to the inverter switching devices of each inverter output phase according to a corresponding one of a plurality of X carriers in each of a plurality of inverter pulse width modulation cycles to convert DC power into multiphase AC output power to drive an associated motor load, each carrier being phase shifted by a non-zero angle 360°/X relative to one another, X being an integer number of inverter output phases of the multiphase inverter; and
   at least one processor operative to:
      convert each of four sets of multiphase inverter output current samples obtained at four different sample times in a given inverter pulse width modulation cycle into a corresponding pair of stationary reference frame current values, the given inverter pulse width modulation cycle having a duration equal to a complete cycle of a carrier waveform used in generating pulse width modulated switching signals to control an output of the inverter, and
      compute an estimated rotor position associated with the motor load for the given inverter pulse width modulation cycle according to the stationary reference frame current values for the given inverter pulse width modulation cycle;
   wherein the four sets of multiphase inverter output current samples are sampled by the at least one processor approximately at peaks, valleys and mid-points of one of a plurality of one of the carriers in the given inverter pulse width modulation cycle wherein the at least one processor is operative to implement closed loop control of the inverter to control operation of the motor load at least partially according to the estimated rotor position.

6. The motor drive of claim 5, wherein the four sets of multiphase inverter output current samples are sampled approximately at 90° intervals in the given inverter pulse width modulation cycle.

7. The motor drive of claim 5, wherein the at least one processor is operative to:
compute the estimated rotor position θ for the given inverter pulse width modulation cycle according to α-β stationary reference frame current value pairs $i_{\alpha i}$ and $i_{\beta i}$ for the four sample times ($t_1$, $t_2$, $t_3$ and $t_4$) according to the following equation:

$$\theta = 0.5 \tan^{-1}\left(\frac{u(1)}{u(2)}\right), \text{where:}$$

$$u(1) = -(i_{\alpha 2} + i_{\beta 1}),$$

$$u(2) = i_{\beta 2} - i_{\alpha 1},$$

$$i_{\alpha 1} = i_\alpha(t_1) - i_\alpha(t_3),$$

$$i_{\beta 1} = i_\beta(t_1) - i_\beta(t_3),$$

$$i_{\alpha 2} = i_\alpha(t_2) - i_\alpha(t_4), \text{ and}$$

$$i_{\beta 2} = i_\beta(t_2) - i_\beta(t_4);$$

8. A method for estimating a rotor position of a motor load driven by an inverter, the method comprising:
sampling four sets of multiphase inverter output current samples at four different sample times in a given inverter pulse width modulation cycle approximately at peaks, valleys and mid-points of one of a plurality of phase shifted carriers used to operate the inverter in the given inverter pulse width modulation cycle, the given inverter pulse width modulation cycle having a duration equal to a complete cycle of a carrier waveform used in generating pulse width modulated switching signals to control an output of the inverter;
using at least one processor, converting each of the four sets of multiphase inverter output current samples into a corresponding pair of stationary reference frame current values; and
using the at least one processor, computing an estimated rotor position for the given inverter pulse width modulation cycle according to the stationary reference frame current values for the given inverter pulse width modulation cycle and implementing closed loop control of the inverter to control operation of the motor load at least partially according to the estimated rotor position.

9. The method of claim 8, comprising sampling the four sets of multiphase inverter output current samples approximately at 90° intervals in the given inverter pulse width modulation cycle.

10. The method of claim 8, comprising:
computing the estimated rotor position θ for the given inverter pulse width modulation cycle according to α-β stationary reference frame current value pairs $i_{\alpha i}$ and $i_{\beta i}$ for the four sample times ($t_1$, $t_2$, $t_3$ and $t_4$) according to the following equation:

$$\theta = 0.5 \tan^{-1}\left(\frac{u(1)}{u(2)}\right), \text{where:}$$

$$u(1) = -(i_{\alpha 2} + i_{\beta 1}),$$

$$u(2) = i_{\beta 2} - i_{\alpha 1},$$

$$i_{\alpha 1} = i_\alpha(t_1) - i_\alpha(t_3),$$

$$i_{\beta 1} = i_\beta(t_1) - i_\beta(t_3),$$

$$i_{\alpha 2} = i_\alpha(t_2) - i_\alpha(t_4), \text{ and}$$

$$i_{\beta 2} = i_\beta(t_2) - i_\beta(t_4);$$

11. The method of claim 10, comprising sampling the four sets of multiphase inverter output current samples approximately at 90° intervals in the given inverter pulse width modulation cycle.

12. A non-transitory computer readable medium with computer executable instructions for estimating a rotor position of a motor load driven by an inverter, comprising computer executable instructions for:
sampling four sets of multiphase inverter output current samples at four different sample times in a given inverter pulse width modulation cycle approximately at peaks, valleys and mid-points of one of a plurality of phase shifted carriers used to operate the inverter in the given inverter pulse width modulation cycle, the given inverter pulse width modulation cycle having a duration equal to a complete cycle of a carrier waveform used in generating pulse width modulated switching signals to control an output of the inverter;
converting each of the four sets of multiphase inverter output current samples into a corresponding pair of stationary reference frame current values; and
computing an estimated rotor position for the given inverter pulse width modulation cycle according to the stationary reference frame current values for the given inverter pulse width modulation cycle and implementing closed loop control of the inverter to control operation of the motor load at least partially according to the estimated rotor position.

* * * * *